Patented Feb. 2, 1932

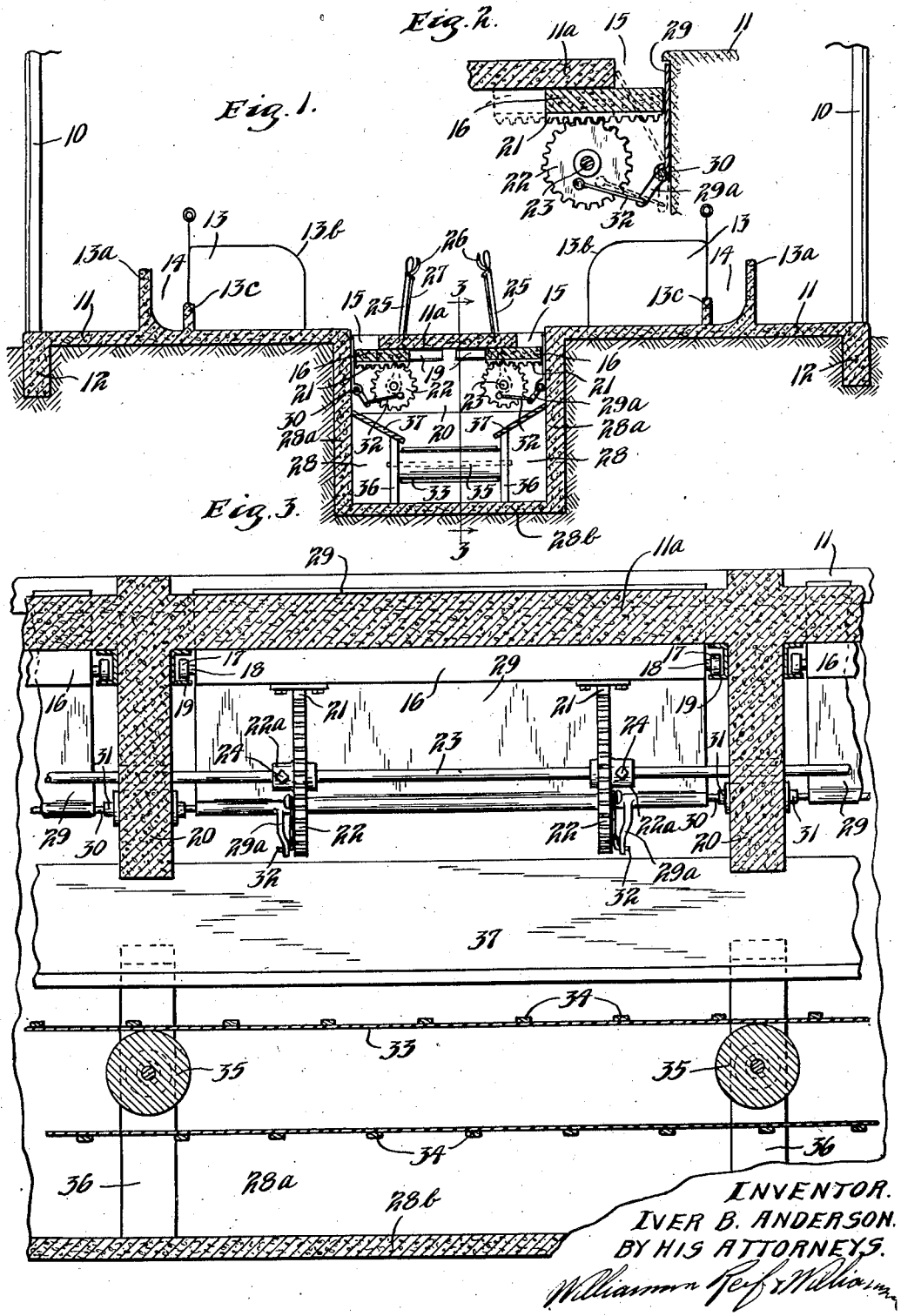

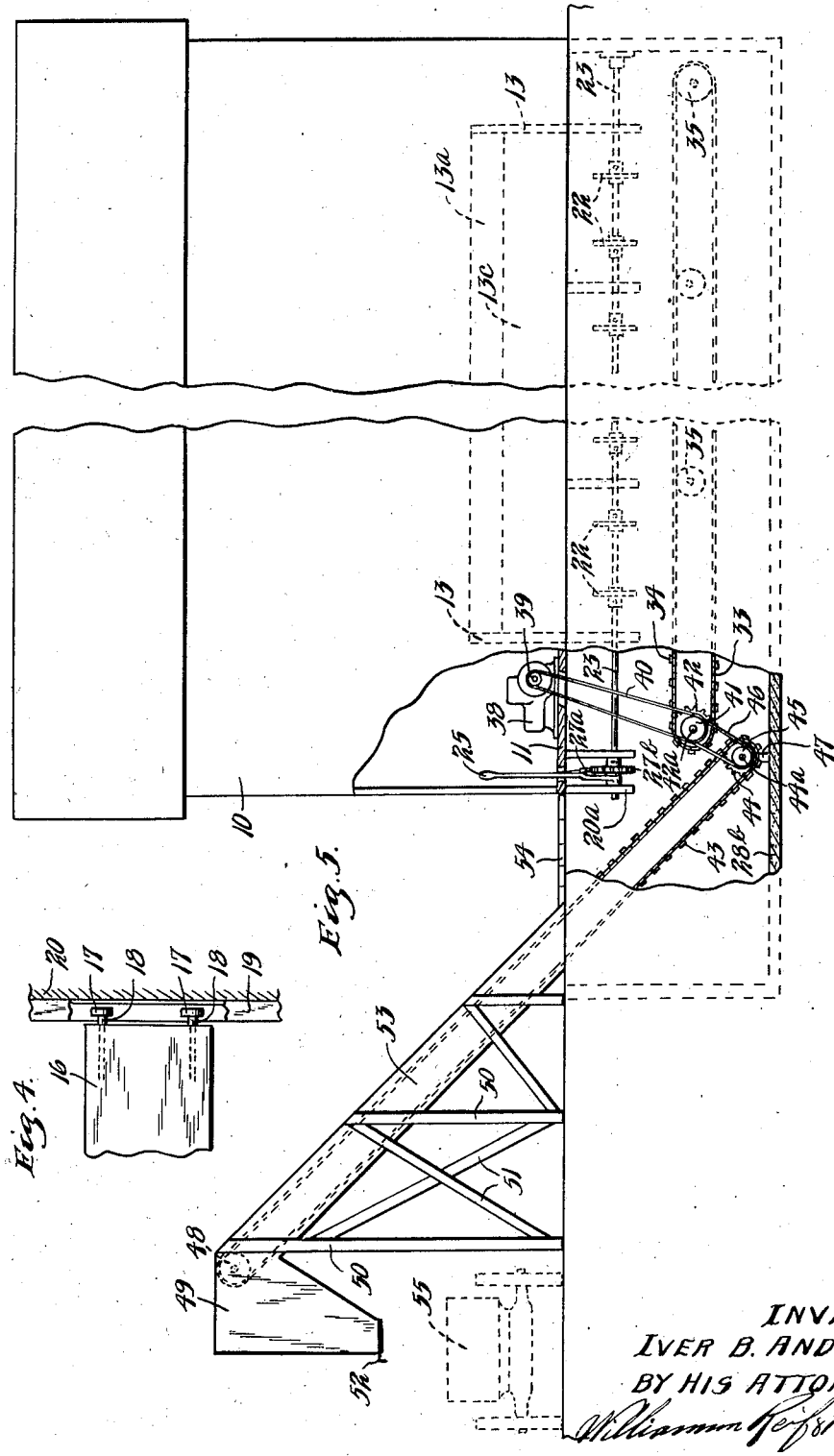

1,843,593

UNITED STATES PATENT OFFICE

IVER B. ANDERSON, OF ST. CLOUD, MINNESOTA

STABLE CLEANING APPARATUS

Application filed March 21, 1930. Serial No. 437,846.

This invention relates to a cattle barn and particularly to the portion of the barn in which the cattle are stationed. As is well known, cattle barns or stables have provisions for rows of cattle or rows of cattle stalls. There is also sometimes a trough in the rear of the stalls or cattle portion into which the refuse and manure may drop. It is desirable to have some efficient and easily operable means for disposing of this manure and refuse without having to handle the same manually with a fork or shovel.

It is an object of this invention, therefore, to provide a simple and efficient device for removing the manure and refuse from the rear of the stall portion and moving the same from the barn or stable.

It is a further object of the invention to provide a cattle barn having a floor with a trough in the rear of the cattle, said trough having a movable bottom adapted to discharge the refuse and manure, together with a conveyor disposed beneath the movable bottom on which the manure is received and removed.

It is still another object of the invention to provide such a device as set forth in the preceding paragraph together with means preferably in the form of a plate for covering the opening left by the movable bottom of the trough so that an animal may not get its foot caught in said opening.

It is a further object of the invention to provide a cattle barn having oppositely facing cattle receiving portions with a trough in the floor at the rear of each portion, movable bottom members in said troughs, means for moving the bottom members of each trough simultaneously, a conveyor beneath the floor on which the manure and refuse from each trough is received, together with means for guiding said manure and refuse to the conveyor.

These and other objects and advantages of the invention will be fully set forth in the following description made in connection with the accompanying drawings, in which like reference characters refer to similar parts throughout the several views, and in which:—

Fig. 1 is a vertical section taken in a direction longitudinally of the stalls;

Fig. 2 is a partial view similar to Fig. 1, shown on an enlarged scale;

Fig. 3 is a vertical section taken on line 3—3 of Fig. 1 as indicated by the arrows;

Fig. 4 is a partial plan view of the end of one of the movable trough bottoms used, and Fig. 5 is a view in side elevation of the barn and mechanism, some parts being broken away and others shown in vertical section.

Referring to the drawings, a portion of a cattle barn or stable is shown comprising the walls 10 and the floor 11. While the floor may be variously made, in the embodiment of the invention illustrated it is shown as constituting a layer of concrete and extending at the sides to the supports 12 at the sides of the building. The floor 11 has rising therefrom walls 13 and 13a forming the stall portion. A shorter wall 13c is shown forming a manger 14. Stanchion posts 13d are also indicated. In the rear of the stall portion, the floor has troughs 15 formed therein extending longitudinally of the stable or barn, a portion of the floor 11a being shown between the troughs 15. The trough members 15 have their bottoms formed by members 16. While members 16 might be variously made, in the embodiment of the invention illustrated they are shown as made of concrete, the same preferably being held in a metal frame (not shown). Rollers 17 are disposed at the sides of members 16 the same being journaled on the short shafts 18 secured in members 16. The rollers 17 are disposed in and roll in channel members 19 secured to the downwardly extending partition members 20. The members 20 will be disposed so as to be between two of the cattle or between two stall portions. The members 16 are thus movable transversely and means are provided for simultaneously moving the members 16 in the rear of each stall portion or in the rear of each row of cattle. While the moving means might be variously made, in the embodiment of the invention illustrated, members 16 are shown as having rack members 21 secured to their under surfaces with which mesh the gears 22. Gears 22 are provided with hubs 22a secured on the shaft 23 by means of the set screws 24. The shafts 23 extend through the members 20 and will have secured thereto the gears 22 for each member 16, each shaft at one end having journaled thereon a lever 25. Levers 25 are shown as provided with pawl-operating grip handles 26 of well known type which will be connected by rods 27 to suitable pawls 27a co-operating with and adapted to engage and move gears 27b also secured respectively to the shafts 23, said levers and gears being disposed between a pair of downwardly extending members 20a. A pit 28 is formed beneath troughs 15 and floor section 11a, the same having vertical walls 28a and a bottom 28b. Plates 29 extend along the inner sides of walls 28a, said walls as shown in Fig. 2 preferably having a rib extending over the tops of said plates. Plates 29 are swingably or hingedly mounted on a rod 30 carried in bearings 31 secured to the sides of members 20. Said plates have arms 29a projecting therefrom and rigid therewith each pivotally secured at its end to one end of a link 32 the other end of which is pivotally secured to the side of one of the gears 22.

A conveyor 33 shown as of the endless type and comprising an apron with cleats 34 secured thereto and extending transversely thereof is disposed in the pit 28. Said conveyor runs over rollers 35 having trunnions journaled in spaced standards 36 upstanding from the bottom 28b of pit 28. Guiding members or chutes 37 incline downwardly from the side walls 28a to the sides of conveyor 33, the same being shown as supported on the standards 36. Conveyor 33 is driven from some suitable motor 38 shown as mounted on floor 11 and having a driving pulley 39 over which runs a belt 40 adapted to drive a pulley 41 secured to a driving roller or sprocket 42 which is at one end of conveyor 33. Said roller or sprocket 42 is provided with trunnions 42a journaled in a pair of standards 36 not shown. Another conveyor 43 is shown similar in construction to conveyor 33 which runs over a driving roller or sprocket 44 disposed adjacent the bottom of pit 28 and at one end thereof, said driving roll and sprocket 44 having a pulley 45 thereon driven by a belt 46 from pulley 41. Sprocket 44 and pulley 45 have shafts or trunnions 44a journaled in standards 47 similar to standards 36. Conveyor 43 extends upwardly from pit 28, which pit is shown as extending at one end of the barn and said conveyor at its upper end runs over a roller 48 having trunnions journaled in the side of a discharge chute 49. The discharge chute 49 is supported on a frame work comprising vertical members 50 and diagonally extending brace members 51. Chute 49 has one side inclined downwardly and laterally and is preferably provided at its bottom with a slide 52 normally adapted to close the bottom of said chute, but which is withdrawable to permit the discharge of material from said chute. A housing 53 is shown as enclosing conveyor 43 about the top of pit 28, said pit preferably being covered by the floor extension 54. A wagon 55 is indicated in dotted lines disposed beneath the chute 49.

In operation the cattle will be stationed in the stalls 13 facing the walls 13a. The manure and other refuse from the stable will collect in the trough 15. When it is desired to clean the stable, the operator will swing the levers 25. The swinging of a lever 25 will turn gear 27b and oscillate shaft 23, turning the gears 22. The gears acting on the bottom members 16 will move the same away from walls 28a and the material supported on the bottom members 16 will be pushed off by the edge of floor section 11a and will drop downwardly. This material will be guided by chutes 37 onto conveyor 33 and will be carried away. As gears 22 rotate, links 32 will swing the arms 29a and the plates 29 will be swung from walls 28a toward the floor section 11a as indicated in dotted lines in Fig. 2. Should an animal place its foot down into the trough 15 it will thus engage the plate 29 and its foot will not pass downwardly any great distance. When the material has been cleaned from members 16, the levers 25 are again swung and the members 16 are brought back to normal position as shown in Fig. 1. All of the members 16 in the rear of one row of cattle will be simultaneously operated by movement of a lever 25. The members 16 move easily as rollers 17 roll in the guide members 19, said guide members holding the members 16 in horizontal position.

The manure and refuse dropping from the members 16 will be guided by chutes 37 onto conveyor 33 and will be carried by this conveyor to conveyor 43. Said material will be carried upwardly by conveyor 43 and discharged into the chute or hopper 49. The material can be discharged at the desired times into a vehicle, such as shown at 55 and can thus be hauled away to the desired location. It will be understood that by operating the pawl handles 26 on levers 25 the operator can engage the pawls 27a at different places on the gears 27b and rotate the latter as desired. After the material has been discharged from troughs 15, the operator will again swing the levers 25 and members 16 will be moved back to normal position, plates 29 again moving to normal position along side of walls 28a. It will be understood that motor 38 need only be driven when the material is discharged by operation of levers 25.

From the above description it is seen that applicant has provided quite a simple and efficient stable construction and one which can be effectively and easily cleaned. The device is operated by a simple operation by the operator. The cleaning can be done at the desired intervals and as stated, at these times the motor 38 can be operated to carry away the material. The device will thus be operated at a very small cost. The structure is quite simple, the same can be made very durable and it insures perfect safety for the cattle. A barn equipped with the apparatus can be kept in clean and sanitary condition with very little effort. The structure has been demonstrated and it is obvious that the same will have a high degree of utility for the purpose intended.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:

1. A cattle barn having a stall portion and a floor on which the animals stand and having a trough in said floor at the rear of said portion, movable means forming the bottom of said trough, means for moving said means to discharge the material from said trough and a member adapted to swing over the space left by said movable means to prevent an animal placing its foot therethrough.

2. A cattle barn having a stall portion and a floor on which the animals stand, said floor having a trough in the rear of said animals, a movable member forming the bottom of said trough, a swinging plate normally in vertical position at the side of said trough and constructed and arranged to swing over the space left by said movable member when the latter is moved and means for moving said movable member to discharge material from said trough and for swinging said plate over said space.

3. A cattle barn having in combination, a floor on which an animal stands, said floor having a trough in the rear of said animal, a horizontal movable member forming the bottom of said trough, a rack on the bottom of said member, a gear engaging said rack and adapted to move said member horizontally, a shaft on which said gear is mounted, means for turning said shaft to move said member and discharge material from said trough, a swinging plate normally in vertical position at one side of said trough, an arm on said plate and a link connecting said arm and gear so that when said movable member is moved, said plate is swung over the space left by said movable member.

In testimony whereof I affix my signature.

IVER B. ANDERSON.